Figure 4:
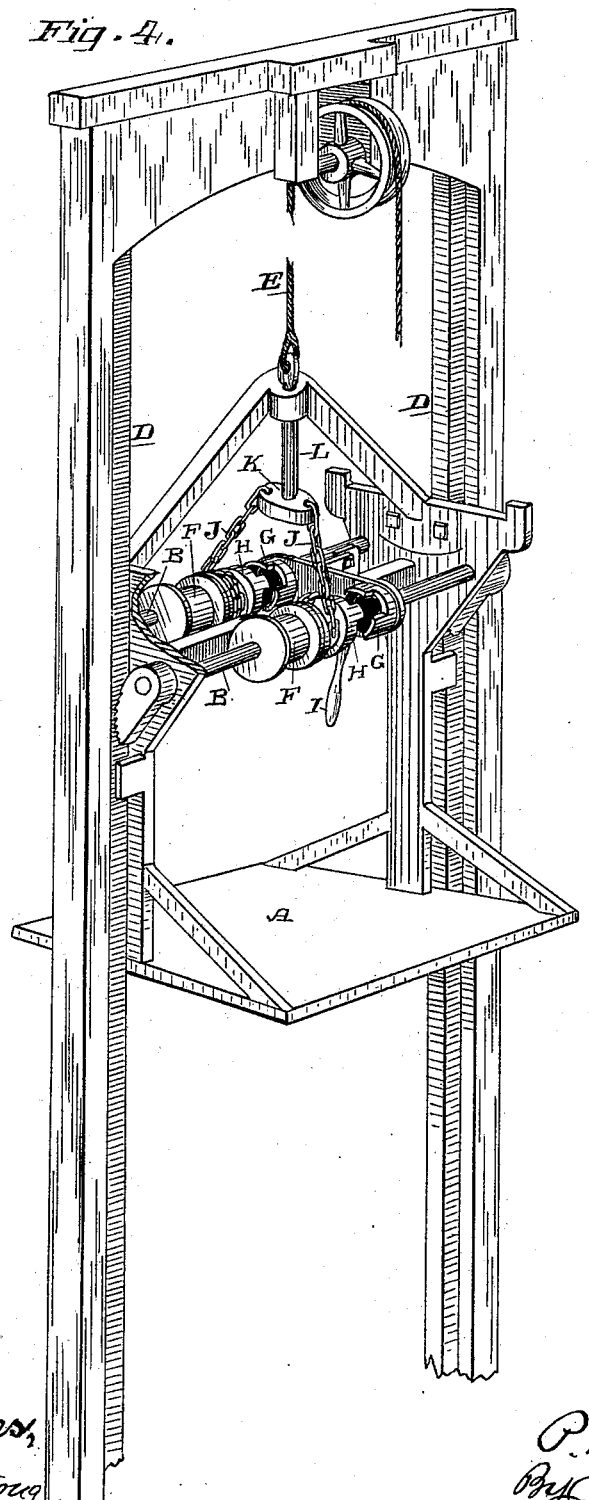

(No Model.)  2 Sheets—Sheet 1.
P. B. SULLIVAN.
ELEVATOR SAFETY ATTACHMENT
No. 396,965.  Patented Jan. 29, 1889.
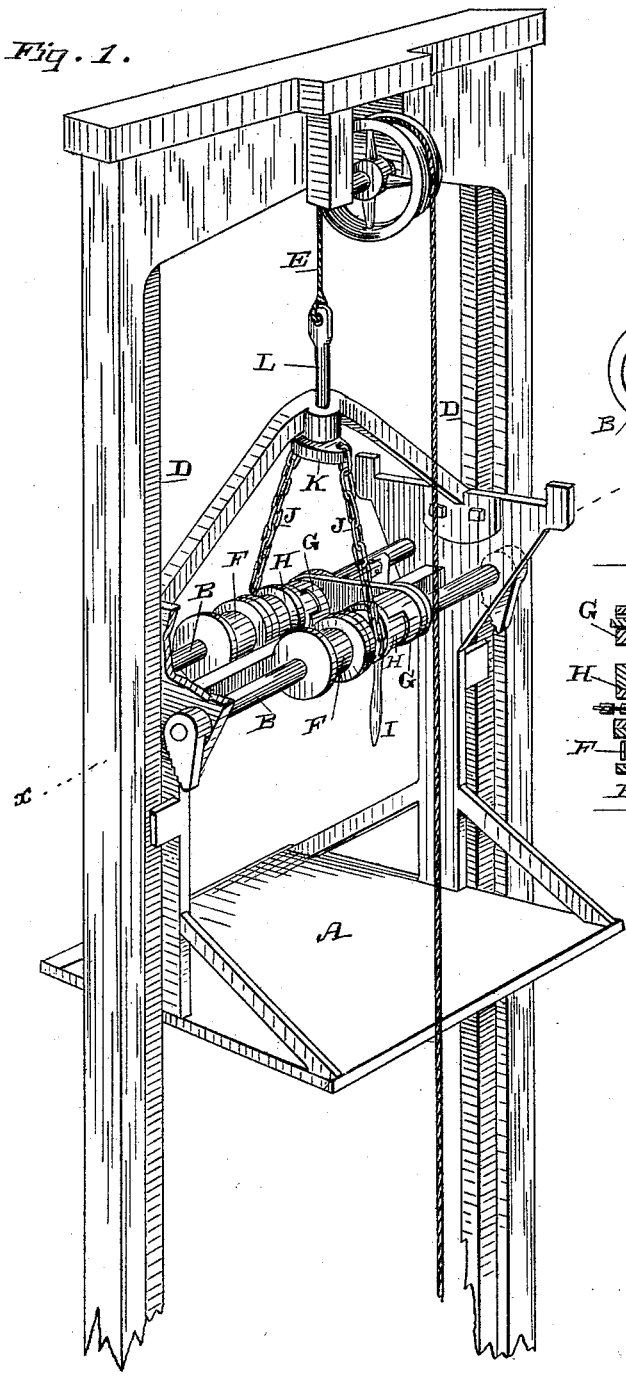
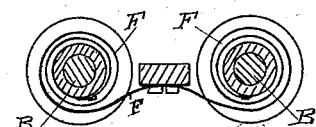
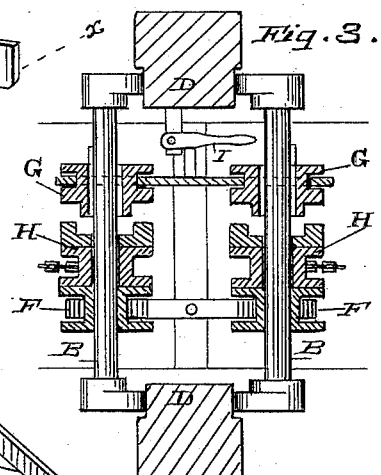
Witnesses,
Geo. H. Strong
J. H. Rowse
Inventor,
P. B. Sullivan
By Dewey & Co,
atty (No Model.)  2 Sheets—Sheet 2.

P. B. SULLIVAN.
ELEVATOR SAFETY ATTACHMENT.

No. 396,965. Patented Jan. 29, 1889.

Witnesses,

Inventor,
P. B. Sullivan
By Dewey & Co.
att'ys

UNITED STATES PATENT OFFICE.

PHILIP B. SULLIVAN, OF TUSCARORA, NEVADA.

ELEVATOR SAFETY ATTACHMENT.

SPECIFICATION forming part of Letters Patent No. 396,965, dated January 29, 1889.

Application filed September 5, 1888. Serial No. 284,674. (No model.)

*To all whom it may concern:*

Be it known that I, PHILIP B. SULLIVAN, of Tuscarora, Elko county, State of Nevada, have invented an Improvement in Safety Attachments for Mining and Elevator Cages; and I hereby declare the following to be a full, clear, and exact description of the same.

My invention relates to a safety attachment for mining and elevator cages; and it consists in the construction and combination of devices which I shall hereinafter fully describe and claim.

Referring to the accompanying drawings for a more complete explanation of my invention, Figure 1 is a view showing the cage suspended and the cams out of contact with the guides. Fig. 2 is a detail view in cross-section of the cam-shafts and their operating-springs. Fig. 3 is a section on line $x$ $x$ of Fig. 1. Fig. 4 shows the clutch disengaged and the cams thrown into contact with the guides.

A is an elevator or mining cage, which may be open, closed, or of any suitable or desirable form. Across the upper part of the cage extend two parallel shafts, B B, which are journaled in the sides of the cage, the ends extending through and having the locking dogs, cams, or eccentrics fixed to these ends, so that when the shafts rotate in one direction the cams will be caused to engage the guides D, upon which the cage travels, with sufficient force to prevent the cage from falling. When the shafts are rotated in the opposite direction, the cams will be held out of contact with the guides, and the cage will be free to be raised or lowered by the usual operation of the hoisting-cable E. Springs F are coiled around the shafts B, and are sufficiently strong, so that when at liberty to act they will rotate the shafts and throw the cams into contact with the guides. In the present case I have shown these springs as being coiled around the shafts, the ends being united below or connected with a central bar. It will be manifest that various forms of spiral or other springs might be used to produce the same result.

G G are clutch-rings sliding upon feathers upon the shafts B, and having their inner ends notched, so as to engage the corresponding notches and projections on the pulleys H, which turn loosely upon the shafts B and between the clutches and the springs. These two sliding clutch-sections are moved to or from the central pulleys, H, by means of a lever, I, which extends downward so as to be within easy reach of the occupants of the cage. Around the pulleys H pass the chains or ropes J, the upper ends being connected with the yoke K, the shank or shaft L of which slides vertically through the upper part of the framework of the cage, and its upper end serves as a point of attachment for the hoisting-cable E. The chains K are coiled around the pulleys H, so that when the cage is suspended from them they act to turn the shafts outward against the coiling tension of the springs and thus throw the cams away from the guides, so that as long as the cage is suspended from the cable, and is not moving downward too fast, the weight of the cage will be sufficient to keep the cams turned outward and away from the guides. If, however, the cable should at any time break, there would be no strain upon the suspending chains or ropes J, and this being relieved the springs D would act to rotate the shafts and throw the cams into contact with the guides, so as to stop the cage at once. For all this operation it is not necessary to disengage the clutches from the loose or suspending pulleys; but if at any time it should be found desirable to stop the cage in its downward movement when the cable is not broken, it is only necessary for the occupants of the cage to move the lever I so as to release the sliding clutches G from the suspending-pulleys H, when the pulleys will turn loosely on the shafts, by reason of the tension on the suspending-rope, and the springs will be allowed to exert their force, so as to rotate the shaft in the opposite direction and throw their cams in contact with the guides, thus checking the downward movement of the cage.

By this construction I produce two results: First, when the cable breaks, the shafts B B are released from the suspending strain of the ropes or chains J, and the springs are allowed to act and throw the cams into engagement with the guides; secondly, if while the cable is intact and the cage is descending it may be found necessary to check the cage without notifying the engineer, it is instantly done by releasing the clutch mechanism, which thus releases the shafts from the suspending strain that serves to hold the cams out of engagement with the guides, and this strain being released the springs will act as above to throw the cams inward and into contact with the guides.

Having thus described my invention, what I claim as new, and desire to secure by Letters Patent, is—

The horizontal shafts journaled upon the hoisting or elevator cage, having the cams fixed to the outer ends, so as to engage the guides within which the cage travels, springs acting to rotate the shafts, so as to force the cams into engagement with the guides, and pulleys around which suspending ropes or chains pass and connect with the cable to produce a tension in the opposite direction from that of the springs, in combination with clutch-sections sliding upon feathers upon the shafts and engaging the suspending-pulleys, and a lever by which the clutch is disengaged, so as to allow the springs to act and throw the cams into engagement with the guides, substantially as and for the purpose herein described.

In witness whereof I have hereunto set my hand.

PHILIP B. SULLIVAN.

Witnesses:
PHILIP SNYDER,
EDWARD TODD.